No. 765,225. PATENTED JULY 19, 1904.
L. B. COLIN.
HOSE COUPLING.
APPLICATION FILED MAR. 18, 1904.
NO MODEL.

Witnesses

Louis B. Colin, Inventor.
by C. A. Snow & Co
Attorneys

No. 765,225.

Patented July 19, 1904.

UNITED STATES PATENT OFFICE.

LOUIS B. COLIN, OF JOHNSTOWN, NEW YORK.

HOSE-COUPLING.

SPECIFICATION forming part of Letters Patent No. 765,225, dated July 19, 1904.

Application filed March 18, 1904. Serial No. 198,787. (No model.)

*To all whom it may concern:*

Be it known that I, LOUIS B. COLIN, a citizen of the United States, residing at Johnstown, in the county of Fulton and State of New York, have invented a new and useful Hose-Coupling, of which the following is a specification.

My invention relates to pipe-couplings, being especially designed for connecting hose-sections, and has for its object to produce a comparatively simple inexpensive device of this character by which the sections will be firmly and tightly coupled and this without the employment of a spanner in the coupling operation and one wherein the latter operation may be performed by opposite rotation of the coupling members in either direction.

To these ends the invention comprises the novel features of construction and combination of parts more fully hereinafter described.

Figure 1:
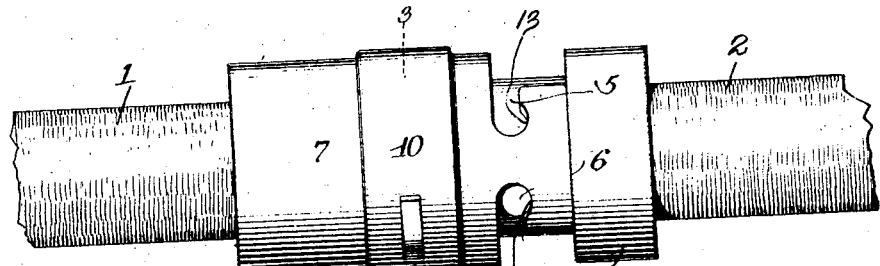
Figure 2:
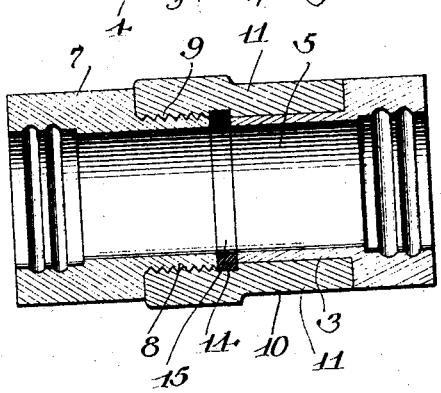
Figure 3:
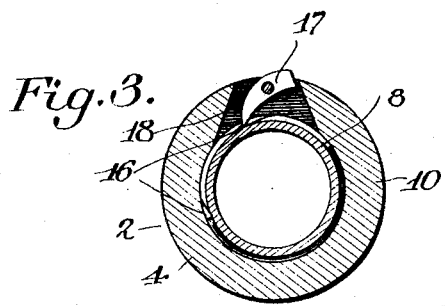
Figure 4:
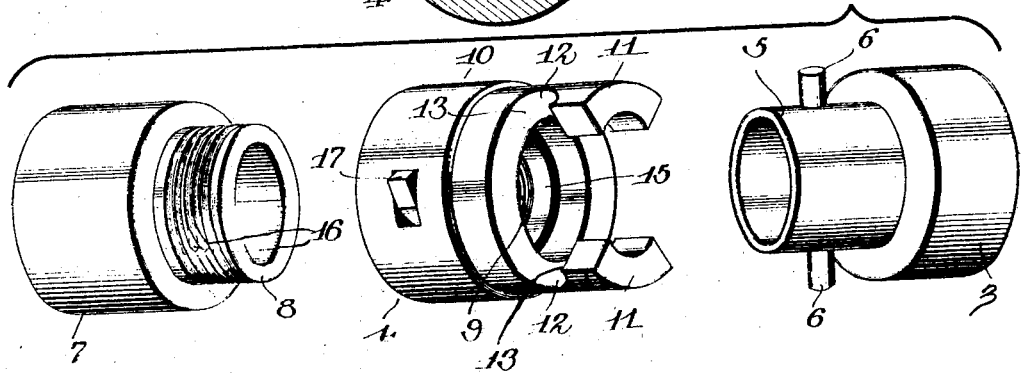

In the accompanying drawings, Figure 1 is an elevation of my improved coupler, illustrating the same applied for use. Fig. 2 is a longitudinal section through the coupling members engaged. Fig. 3 is a transverse section of the line 3 3 of Fig. 1. Fig. 4 is a perspective view showing the parts of the coupler disconnected.

Referring to the drawings, 1 and 2 designate, respectively, hose or pipe sections, of which the section 1 carries the male coupling member 3 and the section 2 carries the female coupling member 4. The male member 3, which is composed of any suitable material, is of tubular form and comprises an enlarged body portion for the reception of the end of the pipe-section and a reduced throat or nozzle 5, having a pair of oppositely-disposed laterally-projecting engaging lugs or trunnions 6. The female member 4 comprises a primary section 7, having an enlarged portion for the reception of the end of the pipe-section 2 and a reduced externally-threaded neck 8, adapted to enter an internally-threaded portion 9 of the secondary section 10, which latter has projecting longitudinally forward from its front end a pair of oppositely-disposed T heads or ears 11, forming recesses 12 for the reception of the trunnions 6 when the parts are in coupled engagement, the outer ends of the ears 11 being slightly inclined rearwardly and outwardly, as at 13, thereby producing cam-faces which when the parts are coupled lie upon the outer sides of the trunnions 6 for the purpose which will be more fully explained hereinafter.

Provided within the section 10 of the female member 4 is a transversely-disposed annular groove or channel 14, designed for the reception of a rubber packing-gasket 15, while upon the threaded portion or neck 8 of section 7 there is provided a pair of peripherally-spaced notches or depressions 16, which mutilate or interrupt the threads and constitute stops or abutments, either of which may be engaged by a spring-pressed locking member or latch 17, mounted in a transverse opening or recess provided through the wall of the section 10 in rear of the gasket 15, said latch being normally pressed to engaging position by means of a spring 18. From this arrangement it is apparent that as the neck 8 is screwed into the section 10 the latch 17 will automatically engage with one of the stops 16, thereby preventing backward rotation of the section 7, which may, however, be rotated forwardly until the outer end of the neck bears against the packing-gasket 15. When, however, it is desired to disconnect the section of the female member, the latch may be externally operated for disengaging it from the abutments 16, thereby permitting free backward rotation of the section 7.

In practice when the parts are brought into coupling engagement the nozzle 5 will enter the forward open end of the female member and will bear at its end upon the packing-gasket 15. Reverse rotation of the members 3 and 4 in either direction will cause the trunnions 6 to enter, respectively, a pair of the recesses 12, thereby maintaining the members in coupled engagement. As the trunnions enter the recesses they ride beneath the cams 13, which thereby draw the coupling members together longitudinally and cause the end of the member 3 to slightly compress the rubber packing 15, which on expanding after the trunnions have passed the cams throw the trunnions in the recesses behind the cams, whence it will be seen that the gasket, in addition to its usual office, subserves the further function of a spring for pressing the trunnions securely within their recesses to prevent accidental uncoupling of the members 3 and 4.

From the foregoing it will be seen that I produce a simple inexpensive device admirably adapted for the attainment of the ends in view, it being understood, however, that minor changes may be made therein without departing from the spirit of the invention.

Having thus described my invention, what I claim is—

In a device of the class described, the combination with a female member, of a coöperating male member, means for maintaining said members in coupling engagement, said female member comprising a primary section having a threaded neck provided with stops or abutments, and a secondary section internally threaded for the reception of said threaded neck, and a spring-actuated latch adapted for automatic engagement with the said stops to prevent backward rotation of the primary section.

In testimony that I claim the foregoing as my own I have hereto affixed my signature in the presence of two witnesses.

LOUIS B. COLIN.

Witnesses:
 HARWOOD DUDLEY,
 JOHN M. RUSSELL.